July 21, 1925.

A. KRAMER 1,547,049

INSECT DESTROYER

Filed March 11, 1925     3 Sheets-Sheet 2

Fig. 2.

INVENTOR.
Albert Kramer
BY
Geo. P. Kimmel ATTORNEY.

July 21, 1925.
A. KRAMER
INSECT DESTROYER
Filed March 11, 1925
1,547,049
3 Sheets-Sheet 3
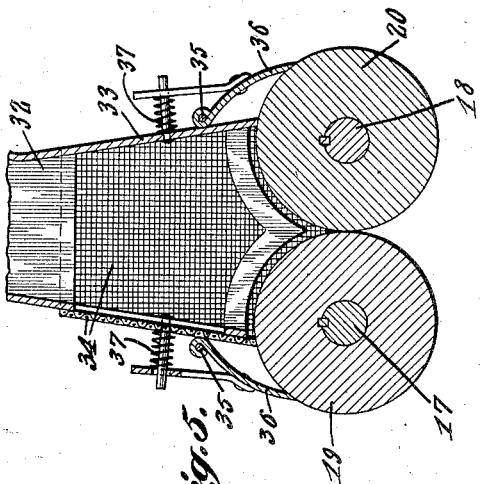
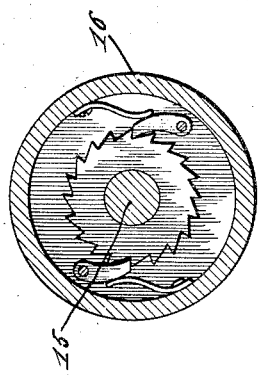
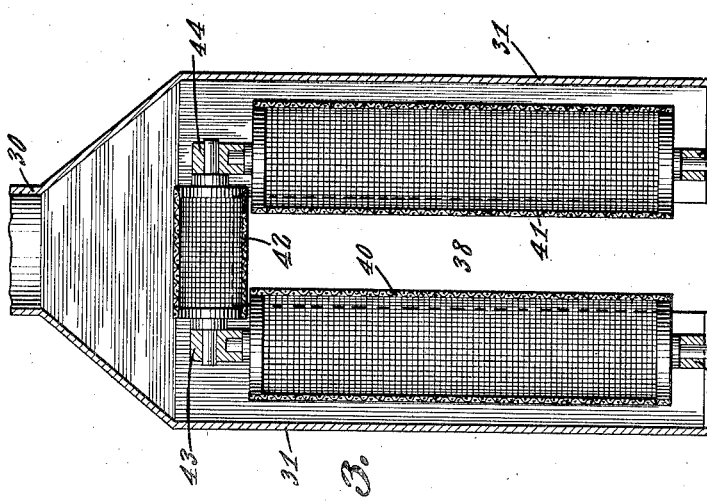
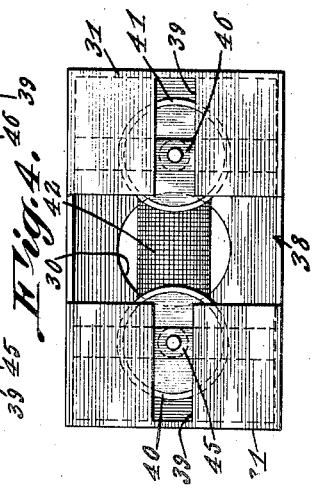
INVENTOR.
Albert Kramer
BY
Geo. P. Kimmel.
ATTORNEY Patented July 21, 1925.

1,547,049

UNITED STATES PATENT OFFICE.

ALBERT KRAMER, OF HARPER, TEXAS.

INSECT DESTROYER.

Application filed March 11, 1925. Serial No. 14,716.

*To all whom it may concern:*

Be it known that I, ALBERT KRAMER, a citizen of the United States, residing at Harper, in the county of Gillespie and State of Texas, have invented certain new and useful Improvements in Insect Destroyers, of which the following is a specification.

This invention relates to insect destroyers, more particularly to devices of this character operative to remove insects from growing plants, and has for one of its objects to simplify the construction and increase the efficiency and utility of devices of this character.

Another object of the invention is to produce a device of this character which will remove insects and their larva from living plants and from the ground beneath the plants and destroying the same and without injuring the plants.

With these and other objects in view, the invention consists in certain novel features of construction as hereinafter shown and described and then specifically pointed out in the claims, and in the drawings illustrative of the preferred embodiment of the invention, Fig. 1 is a plan view of the improved apparatus with the fan casing in section on the line 1—1 of Fig. 2.

Fig. 2 is a side elevation with the gearing shield in longitudinal section.

Fig. 3 is an enlarged vertical section of the plant engaging shell.

Fig. 4 is a bottom plan view of the part shown in Fig. 3.

Fig. 5 is an enlarged sectional detail of the crushing rolls and the portion of air conductor adjacent thereto.

Fig. 6 is an enlarged sectional detail of the backing ratchet.

Figure 1:
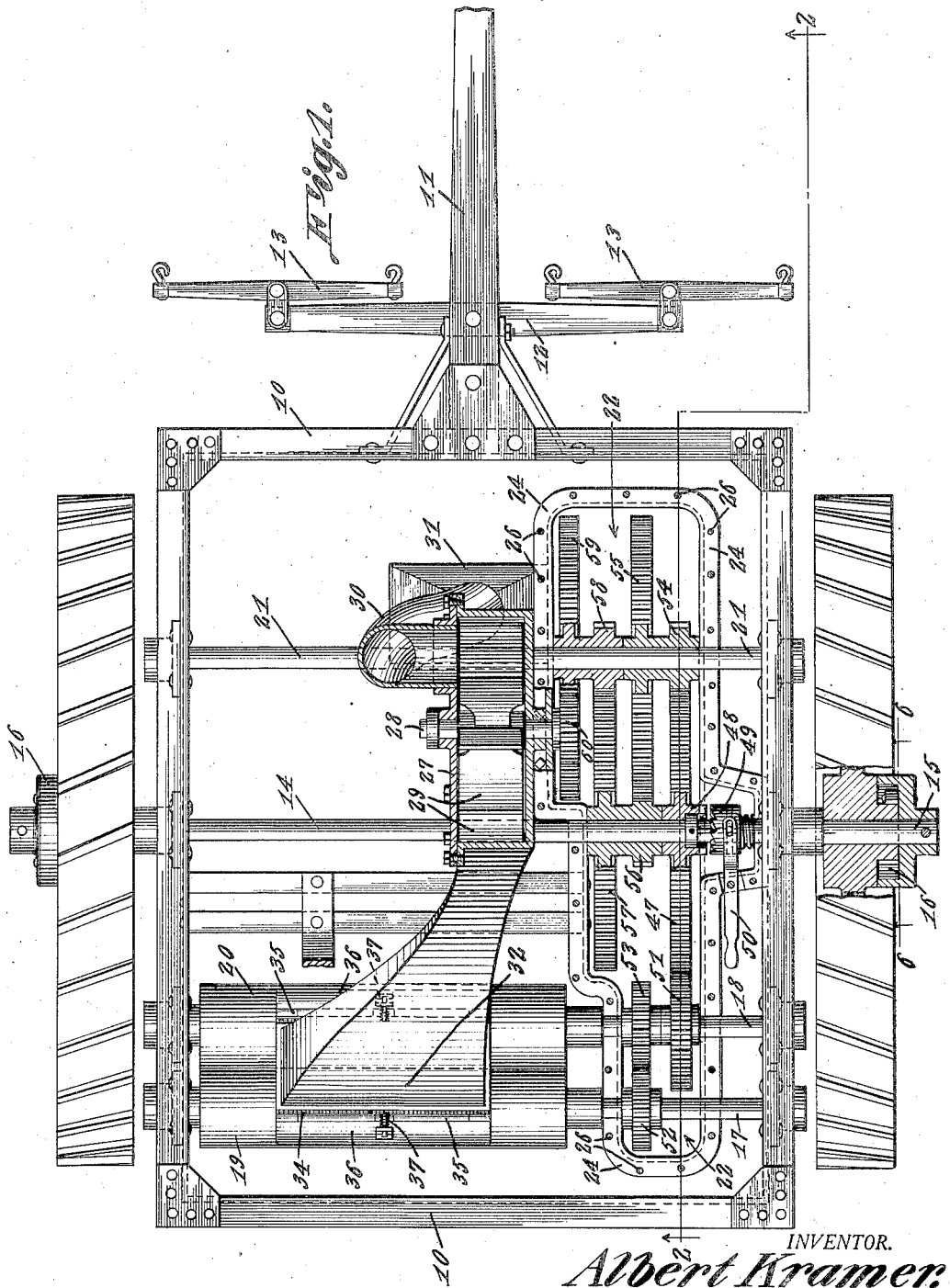

The improved device includes a supporting frame represented as a whole at 10, oblong in outline and with a draft tongue 11, rigidly attached thereto, and provided with the usual double tree 12 and single trees 13 for the draft animals.

An axle 14 is coupled to the frame 10 with bearing wheels 15 mounted thereon and backing ratchets, one of which is indicated conventionally, at 16.

Mounted on the frame 10 are twin shafts 17 and 18 carrying crushing rolls 19 and 20.

Mounted for rotation on the frame 10 is a counter shaft 21, and enclosing the axle 14 and the shafts 17—18 and 21 is a protecting shell or hood formed of a lower portion 22 and upper portion 23 having outwardly directed coupling flanges 24—25 united by bolts 26, and also serving as a reservoir for oil to lubricate the gears.

Disposed upon the frame 10 is a fan casing 27 with its shaft 28 journalled in the casing 27 and in the upper portion 23 of the hood, and carrying the fan blades 29.

Depending from the fan casing 27 is an intake conductor 30, the latter is connected at its lower end into the upper end of a shell 31 and at its upper end into the fan casing near the eye, as shown.

Leading from the fan casing 27 is an outlet conductor 32 with its outer portion turned downwardly and enlarged as at 33 to partly encompass the crushing rolls 20.

Three sides of the enlargement 33 are formed of screen material 34, to provide for the escape of the induced air from the fan.

Pivoted at 35 to the enlargement 33—34 of the outlet conductor 32 are scraper devices 36 to clear the rollers of the crushed insects, the scrapers being spring supported as shown at 37.

The shell 31 is formed with a relatively large vertical opening therethrough from front to rear, and indicated at 38, and likewise formed with lateral openings 39 in the bottom of the shell and communicating with the vertical opening. The shell 31 thus constructed will pass over the plants as the device is drawn forwardly, as will be obvious.

The side and upper walls of the opening 38 are formed of relatively coarsely perforated material, and for the purpose of illustration these perforated walls are formed of freely revolving cylindrical bodies 40—41 and 42, journalled at the ends in transverse supports 43—44 and 45 and 46. The members 40—41 and 42 extend at their confronting faces for a distance into the vertical opening 38, so that as the device is moved forwardly, the perforated members will be drawn over the leaves and branches of the plants and bending them forwardly and downwardly and detaching the insects therefrom and exposing the latter to the influence of the strong induced air currents produced through the perforated members and carrying them into the fan casing 27 where they will be caught by the rapidly revolving fan blades 29 and conducted thence to the rapidly revolving crushing rolls by which they will be destroyed and dropped to the ground or otherwise disposed of.

Means are provided for rapidly rotating the fan blades and the crushing rolls from the axle 15, for instance by a train of gears within the housing or shield 23, as shown, and including a master gear 47 loose on the axle and with a clutch element 48 in its hub coacting with an opposing spring pressed clutch element 49 rotative with the axle and slidable thereon and operative by a shipping lever 50. By this means the master gear and its fellows may be coupled to and uncoupled from the axle.

Mounted on the shaft 18 and engaged by the master gear 47 is a smaller gear 51, and mounted on the shafts 17—18 are engaging gears 52 and 53. By this means the motion of the axle as the device is moved forwardly will be communicated at increased speed to the crushing rolls.

Mounted on the counter shaft 21 and running loosely thereon is a pinion 54, the hub of the pinion being integral with the hub of a gear 55. Mounted to rotate loosely on the axle 14 is a pinion 56 in position to be engaged by the gear 55, the hub of the pinion 56 being integral with the hub of a gear 57. Mounted for rotation on the countershaft 21 is a pinion 58 in position to be engaged by the gear 57, and integral with the hub of the pinion 58 is a gear 59.

Mounted on the shaft 28 is a pinion 60 engaged by the gear 59. By this arrangement the motion of the axle will be communicated to the fan at a greatly increased speed.

The driver's seat is represented at 61 and connected to the frame 10 by the usual standard 62.

As the machine is moved over the ground, the leaves of the plants on which the insects and their larvæ are lodged are pushed aside by contact with the perforated elements 40—41— and 42, and the insects picked off by the strong induced air currents and drawn through the meshes or perforations and carried thence through the shell 31 and conductor 30 into the fan and thence by the fan blades into the conductor 32 and thence to the crushing rolls, the air passing out through the screen portion 34 of the conductor.

The strong upward suction through the space 38 also operates effectually to pick up the "squares" or flared involucres that have dropped from the plant, and carry them also through the cylinders and to the crushing rolls.

It will be noted that the forward side 33 of the conductor 32 opposite to the screen 34 is solid or unperforated, so that none of the induced air currents will be thrown against the person of the driver on the seat.

The device is especially effective for catching and destroying the boll weevil, but will be equally efficacious for destroying other insects.

The improved device is simple in construction, can be constructed of any size or of any suitable material, and operates effectually for the purpose described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described my invention what I claim as new is:

1. A device of the class described comprising a shell having a passage therethrough and dividing the shell into spaced compartments having openings in their confronting walls, and adapted to pass over growing plants, a member having perforated sides and supported for rotation in each of said compartments and operative through the openings thereof, a series of crushing rolls, a conductor between said shell and the crushing rolls, and means for inducing air currents through said conductor and the shell and the perforated members therein.

2. A device of the class described, comprising a downwardly opening bifurcated shell adapted to pass over a row of growing plants, a plurality of cylindrical drums mounted to freely rotate within said shell and projecting into the opening therein, the walls of said drums being formed of perforated material with relatively large openings, a series of crushing rolls, an air conductor between said shell and the crushing rolls, and means for inducing air currents through said air conductor and the shell and the perforated drums therein.

3. A device of the class described, comprising a downwardly opening bifurcated shell adapted to pass over a row of growing plants, coacting vertical drums freely rotative in said shell and extending into the opening therein from opposite sides, a horizontally disposed drum freely rotative in said shell and extending into the upper part of the opening therein, a series of crushing rolls, an air conductor between said shell and the crushing rolls, and means for inducing air currents through said air conductor and the shell and the perforated members therein.

In testimony whereof, I affix my signature hereto.

ALBERT KRAMER.